United States Patent Office 3,031,447
Patented Apr. 24, 1962

3,031,447
NEW NITROFURANACRYLIC DERIVATIVES
Haruo Saikachi, Oaza Kanehira, Fukuoka-shi, Japan, assignor to Masajiro Ueno, Nishinomiya, Japan
No Drawing. Filed Sept. 4, 1959, Ser. No. 838,033
Claims priority, application Japan Mar. 18, 1959
5 Claims. (Cl. 260—240)

The present invention relates to new nitrofuran derivatives and more particularly to substituted 5-nitro-2-furyl acrylic acid or its acid amide having an improved antibacterial activity and represented by the following chemical formula:

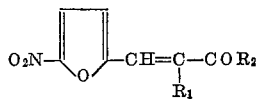

wherein $R_1$ represents phenyl radical or furyl radical and $R_2$ stands for hydroxy radical or amide radical.

I have found that the present new nitrofuran derivatives resulting from substitution of hydrogen atom at α-position in side chain of nitrofuryl acrylic acid or its amide with phenyl or furyl radical has a considerably higher antibacterial activity and lower toxicity than those of the hitherto known nitrofuran derivatives. The nitrofuran derivatives of the present invention are acknowledged to be advantageously employed as chemotherapeutic preparation for various bacterial diseases. For example, bacterial intestinal disorders, such as dysentery and the like, and also bacterial disease may be expected to be effectively treated with a minor amount of any one of the new nitrofuran derivatives of this invention. In case the known nitrofuran derivatives are used as an antiseptic or as a therapeutic agent for coccidium of chicken or an ingredient of ointment, said derivatives would give only a remarkably lower antibacterial activity than the activity in vitro. However, the new nitrofuran derivatives of this invention hardly show the lowering of the activity.

The nitrofuran derivatives of the present invention can be used, for example as antiseptics, therapeutics and the like, as it is or in a form of mixture of them or a mixture with any other antiseptics for the purpose of removing the bacterial derangements of living creatures. For instance these new derivatives exhibit a considerably improved antiseptic activity by a simple operation for example such as addition of them as they are to the foods or dipping of the food in a solution of the new derivatives. For therapeutics, these derivatives also have a wonderful effect for the bacterial disorder in a conventional form such as ointment, power and the like.

The new nitrofuran derivatives of this invention may be synthesized by a new process. For example, nitrofuryl-α-phenyl (or furyl) acrylic acid can be synthesized by Parkin reaction from nitrofurfural and alkali metal salt of phenyl (or furyl) acetic acid. From this nitrofuryl-α-phenyl (or furyl) acrylic acid, acid amide thereof can be obtained in a good yield.

I have found from my experiments that new nitrofuran derivatives of this invention cannot be synthesized by such a process as to first produce 5-nitro-2-furyl acrylic acid and then substitute hydrogen atom at α-position of said acrylic acid with phenyl or furyl radical. It is clear, therefore, that the present compounds are not derivatives from 5-nitro-2-furyl acrylic acid.

This invention will be fully explained by way of practical examples for producing the new nitrofuran derivatives and the preparations consisting of or containing them.

SYNTHESIS OF-5-NITRO-2-FURYL-α-PHENYL ACRYL AMIDE

A mixture of 30 gms. of 5-nitrofurfural, 38 gms. of potassium phenyl acetate and 430 gms. of acetic anhydride is stirred at about 37° C. for about 10 hrs., after which a large amount of water is added to the reaction mixture under continuation of reaction to decompose acetic anhydride. On ice-cooling of the reaction solution yellowish brown crystals may be obtained. Said crystals are recrystallized from 200 cc. of benzene, whereupon 20 gms. of light yellow crystals, M.P. 159° C., can be obtained. This crystal is 5-nitro-2-furyl-α-phenyl acrylic acid.

PREPARATION OF 5-NITRO-2-FURYL-α-PHENYL ACRYL AMIDE

A mixture of 12 gms. of 5-nitro-2-furyl-α-phenyl acrylic acid crystal and 30 gms. of thionyl chloride is heated in a vessel provided with a reflux condenser and calcium chloride tube at 65–70° C. for about 10 hrs. After completion of the reaction thionyl chloride is distilled off under reduced pressure (30 mm. Hg) to give a dark brown residue, from which 12 gms. of light yellow crystals, M.P. 90° C., are obtained by twice recrystallizations with benzene. 7 gms. of said crystal is dissolved in 60 cc. of benzene followed by introducing ammonia gas to the solution, thereby light yellow crystals, M.P. 169° C., are precipitated. Recrystallization of said crystals from 70 cc. of methanol gives 5 gms. of crystal 5-nitro-2-furyl-α-phenyl acryl amide, M.P. 170° C.

SYNTHESIS OF 5-NITRO-2-FURYL-α-FURYL ACRYL AMIDE 4.3 gms. of 5-nitrofurfural is added to a mixture of 5 gms. of potassium furyl acetate and 50 gms. of acetic anhydride with stirring at 60° C. for 6 hrs. After completion of the reaction, the reaction mixture is poured into water and heated at 60° C. for 0.5 hr. to decompose acetic anhydride which leads to formation of dark red crystals. Recrystallization of said crystal from methanol gives 6 gms. of crystal 5-nitro-2-furyl-α-furyl acrylic acid, M.P. 178° C. By the same treatment of said crystals as in the preceding example 5-nitro-2-furyl-α-furyl acryl amide may be obtained.

Acid amides of this invention may also be prepared from furfural itself by a process which comprises at first binding to furfural α-phenyl- or α-furyl- acrylic acid as side chain, nitrating at 5-position of furan nucleus to form nitrofuryl-α-phenyl (or furyl) acrylic acid and converting it to acid amide thereof.

Characteristics and antibacterial activity of the nitrofuran derivatives of this invention will be shown in the following Tables I and II.

Table 1

| Compound | Formula | M.P., °C. | Maximum absorption wave length | Remarks |
|---|---|---|---|---|
| 5-nitro-2-furyl-α-phenyl acrylic acid | NO$_2$–furyl–CH=C(–C$_6$H$_5$)–COOH | 160–161 | | Light yellow crystal. |
| 5-nitro-2-furyl-α-phenyl acryl amide | NO$_2$–furyl–CH=C(–C$_6$H$_5$)–CONH$_2$ | 170 | 2,800, 3,600A. | Do. |
| 5-nitro-2-furyl-α-furyl acrylic acid | NO$_2$–furyl–CH=C(–furyl)–COOH | 178 | | Red crystal. |
| 5-nitro-2-furyl-α-furyl acryl amide | NO$_2$–furyl–CH=C(–furyl)–CONH$_2$ | 151 | 2,200, 3,050A | Orange crystal. |

Table II

| Formula | Bacteria | | | |
|---|---|---|---|---|
| | B. subtilis | St. aureus | B. cereus | M. flavus |
| | Concentration for inhibition of growth, γ/ml. | | | |
| O$_2$N–furyl–CH=C(–C$_6$H$_5$)–COOH | 10 | >50 | 5 | 50 |
| O$_2$N–furyl–CH=C(–C$_6$H$_5$)–CONH$_2$ | 25 | >50 | <1 | 50 |
| O$_2$N–furyl–CH=C(–furyl)–COOH | 25 | >50 | 5 | >50 |
| O$_2$N–furyl–CH=C(–furyl)–CONH$_2$ | 2.5 | 10 | <0.5 | <2 |

NOTE.—Culture medium: 0.5% peptone, 0.5% glucose, 0.3% yeast extracts. pH 7.0, sterilize at 115 pounds pressure for 20 minutes.
Cultivation: at 37° C. for 48 hours.

The nitrofuran derivatives of the present invention have considerably high therapeutic effect for various bacterial diseases as shown in the following clinical demonstrations using 5-nitro-2-furyl-α-furyl acryl amide.

(A) DIRECTIONS AND DOSAGE 0.1–0.2 gram were given 3–6 times a day to cases of acute and chronic diarrhoea.

B. CURATIVE VALUE (1) A case who has loose bowels from fifteen to twenty times a day was completely cured by administration for 4 days of 0.18 gram a day.

(2) A case of acute diarrhoea was completely cured by administration for 2 days of 0.18 gram a day.

(3) A case of chronic diarrhoea whose excretion being mixed with mucus, blood and pus was completely cured on the fourteenth day by administration of 0.18 gram a day.

(4) A case of intestinal tuberculosis who evacuate watery excretion was completely cured by administration for 7 days of 5–6 times of 0.18 gram a day.

(5) Whole of the demonstrations mentioned above were not shown any ill effects.

The therapeutic effect mentioned above has been acknowledged with other nitrofuran derivatives of this invention.

The nitrofuran derivatives of this invention can be compounded with any other ingredients which are commonly used for tablet.

This nitrofuran of this invention can be simply incorporated into ointment basis to give an ointment having antibacterial activity. For ointment basis, conventional petroleum products, wax and the like may be employed. One example will be illustrated as follows:

PREPARATION OF OINTMENT HAVING ANTIBACTERIAL ACTIVITY 1 kg. of finely pulverized 5-nitro-2-furyl-α-phenyl acryl amide, particle size of which is 0.5–3μ is mixed with and suspended in 6.5 kg. of liquid paraffine by the treatment for 150 hrs. on ball-mill. Aforesaid suspension containing nitrofuran is added to the mixture of 942.5 kg. of white vaseline and 50 kg. of white wax, which mixture having been heated at 85° C. and then cooled to 60° C., and cooled to 45–48° C. to solidify. Now 84.5 gms. of water is added to a mixture of 10 gms. of the ointment thus obtained, 5 gms. of sorbitanmonostearate and 0.5 gm. of sodium carboxy methyl cellulose and emulsified by blender under heating to about 70° C. The comparison of inhibition rings tested according to the standard cup method on *B. subtilis* as control is as follows:

| Control | Nitrofuran ointment, mm. |
|---------|--------------------------|
| —       | 12                       |

I have also discovered that a poultry-feed incorporated with the new nitrofuran derivatives can control the disorder of the poultry by microorganisms. The new nitrofuran derivatives may be merely incorporated into the poultry-feed without taking their composition into account. Anticoccidium feed for chickens according to this invention will be explained by way of example as follows:

ANTICOCCIDIUM FEED 1 gm. of finely divided 5-nitro-2-furyl-α-phenyl acryl amide having particle size of 3–5μ is mixed, under fully stirring, with a chicken-feed composed of 6 kg. of ground barley, 2 kg. of rice-bran and 2 kg. of fish meal. This anticoccidium-feed is tested with 10 young roosters of white Leghorn comparing with the control of 10 young roosters. To each of these young roosters to be tested, at first 0.5 ml. of *E. tenella* suspension has previously been and after 8 days, death rates were shown as follows:

|                    | The number of deaths |
|--------------------|----------------------|
| Control            | 7                    |
| Anticoccidium feed | 0                    |

Further nitrofuran derivatives of this invention can be employed for preservation of food. In this case such preservation effect may be exhibited by mixing the nitrofuran derivatives with the food to be preserved and dissolving them by heating or dipping the food in a solution of nitrofuran derivatives. The following example explain fully said preservation effect of the nitrofuran derivatives on the foods, sausage and fresh fish.

PRESERVATION EFFECT OF NITROFURAN DERIVATIVES

(A) PRESERVATION OF SAUSAGE 30 kg. of meat, 750 gms. of table salt and 120 gms. of niter are fully mixed and kept it in icebox for 12 hrs. The product is divided into three (1), (2), (3).
(1) No addition of nitrofuran derivatives.
(2) 25 γ/g. of 5-nitro-2-furyl-α-phenyl acryl amide is added.
(3) 10 γ/g. of 5-nitro-2-furyl-α-furyl acryl amide is added.

Each of them is charged in a container by means of airstuffer and boiled at 80° C. for 40 minutes. In a thermostat (37° C.) they are measured on their preservation period of time elapsed until evolution of gases from interior resulting from the putrefaction which is shown as follows:

| Samples: | Preservation period, days |
|----------|---------------------------|
| (1)      | 4                         |
| (2)      | 9                         |
| (3)      | 9                         |

(B) PRESERVATION OF FRESH FISH

Three sea-breams which have been kept at 0° C. for 2 hrs. after their catch are tested as follows:
(1) No addition of nitrofuran derivatives and iced up.
(2) After dipping in a solution of 10 γ/ml. 5-nitro-2-furyl-α-phenyl acryl amide, iced up.
(3) After dipping in a solution of 5 γ/ml. 5-nitro-2-furyl-α-furyl acryl amide, iced up.

The amount of volatile nitrogen in the samples measured after preservation for 20 days will be shown in the unit of mg./100 g. $NH_3$—N as follows:

| Samples | $NH_3$—N, mg./100 g. | Weight of samples, gms. |
|---------|----------------------|-------------------------|
| (1)     | 102                  | 520                     |
| (2)     | 31                   | 495                     |
| (3)     | 29                   | 535                     |

The new nitrofuran derivatives according to the present invention can be used for preservation of all substances apt to be attacked with microorganisms. For example, when 5-nitro-2-furyl-α-phenyl acryl amide or 5-nitro-2-furyl-α-furyl acryl amide is added in a proportion of about 1:300,000 to starch-paste, the preservation period of time is confirmed to extend about 15 days over that of the control.

What is claimed is:

1. A nitrofuran derivative of the formula:

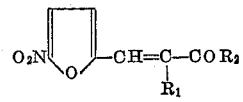

wherein $R_1$ is selected from the group consisting of phenyl radical and furyl radical and $R_2$ is selected from the group consisting of hydroxy radical and amide and radical.

2. 5-nitro-2-furyl-α-phenyl acrylic acid of the formula:

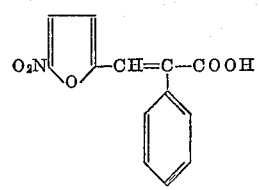

3. 5-nitro-2-furyl-α-phenyl acryl amide of the formula:

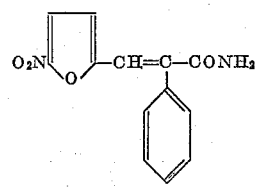

4. 5-nitro-2-furyl-α-furyl acrylic acid of the formula:

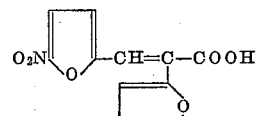

5. 5-nitro-2-furyl-α-furyl acryl amide of the formula:

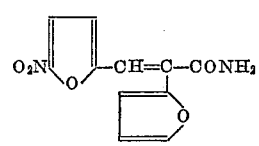

(References on following page)

References Cited in the file of this patent

Chemical Abstracts: vol. 43, cols. 9333–4 (1949).
Chemical Abstracts, vol. 44, cols. 5372 to 5373 (1950).
Chemical Abstracts, vol. 45, column 6691 (1951).
Dunlop et al.: "The Furans," pages 163 to 165; pages 619 to 622, ASC Monograph No. 119, Reinhold Publishing Corporation, New York, N.Y. (1953).
Maxim et al.: Bull. Soc. Chim. [5], vol. 2, pages 582–591 and 600–5 (1953).
Chemical Abstracts, vol. 50, cols. 929 and 3383 (1956).
Crawford et al.: J. Chem. Soc., 1959, pages 722–8.
Chemical Abstracts, vol. 53, column 3529 (1959).
Chemical Abstracts, vol. 53, column 11,699 (1959).